United States Patent
Miguel Sánchez

(10) Patent No.: US 12,018,987 B2
(45) Date of Patent: Jun. 25, 2024

(54) SELF-CALIBRATING SPECTRAL SENSOR MODULES

(71) Applicant: ams Sensors Singapore Pte. Ltd., Singapore (SG)

(72) Inventor: Javier Miguel Sánchez, Zurich (CH)

(73) Assignee: AMS SENSORS SINGAPORE PTE. LTD., Singapore (SG)

( * ) Notice: Subject to any disclaimer, the term of this patent is extended or adjusted under 35 U.S.C. 154(b) by 79 days.

(21) Appl. No.: 17/433,803

(22) PCT Filed: Mar. 25, 2020

(86) PCT No.: PCT/SG2020/050163
§ 371 (c)(1),
(2) Date: Aug. 25, 2021

(87) PCT Pub. No.: WO2020/197498
PCT Pub. Date: Oct. 1, 2020

(65) Prior Publication Data
US 2022/0136901 A1  May 5, 2022

Related U.S. Application Data

(60) Provisional application No. 62/824,612, filed on Mar. 27, 2019.

(51) Int. Cl.
*G01J 3/45* (2006.01)
*G01J 3/26* (2006.01)
*G01J 3/28* (2006.01)

(52) U.S. Cl.
CPC . *G01J 3/45* (2013.01); *G01J 3/26* (2013.01); G01J 2003/2879 (2013.01)

(58) Field of Classification Search
CPC ........ G01J 3/45; G01J 3/26; G01J 2003/2879; G01J 2003/2866; G01J 3/28
See application file for complete search history.

(56) References Cited

U.S. PATENT DOCUMENTS

| | | | |
|---|---|---|---|
| 5,303,165 A | | 4/1994 | Ganz et al. |
| 9,360,366 B1 * | | 6/2016 | Tran ...................... G01J 3/0264 |

(Continued)

OTHER PUBLICATIONS

International Search Report and Written Opinion for Application No. PCT/SG2020/050163 dated Jun. 25, 2020 (11 pages).

(Continued)

*Primary Examiner* — Tarifur R Chowdhury
*Assistant Examiner* — Akbar H. Rizvi
(74) *Attorney, Agent, or Firm* — VIERING, JENTSCHURA & PARTNER mbB

(57) ABSTRACT

An example system includes a housing defining a cavity and an aperture, a photodetector disposed within the cavity, a voltage-tunable interferometer disposed within the cavity between the aperture and the photodetector, a first light source disposed within the cavity, and an electronic control device. The electronic control device is operable to vary an input voltage applied to the interferometer, and concurrently, cause the first light source to emit light towards the interferometer and measure light reflected from the interferometer using the photodetector. The electronic control device is also operable to determine a calibrated input voltage based on light reflected from the interferometer and measured by the photodetector. The electronic control device is also operable to apply the calibrated input voltage to the interferometer, and concurrently, obtain one or more spectral measurements using the photodetector.

20 Claims, 9 Drawing Sheets

(56) References Cited

U.S. PATENT DOCUMENTS

2010/0250182 A1*  9/2010  Matsumoto ............... G01J 3/02
                                                     702/106
2014/0168636 A1*  6/2014  Funamoto ............. G01J 3/0205
                                                     356/454
2018/0188110 A1*  7/2018  Goldring ............... G01J 3/0213

OTHER PUBLICATIONS

Chinese office action issued for the corresponding Chinese patent application No. 202080025047.7, dated Nov. 29, 2023, 8 pages (for informational purposes only).

* cited by examiner

SELF-CALIBRATING SPECTRAL SENSOR MODULES

TECHNICAL FIELD

The disclosure relates to spectral sensor modules for use in spectrometers.

BACKGROUND

A spectrometer is an instrument used to measure a light spectrum of sample light (e.g., to determine the spectral components of ultraviolet, visible, and/or infrared light). In some implementations, spectrometers can determine the intensity of light as a function of wavelength or of frequency.

Spectrometers can be used for a variety of different applications. For example, spectrometers can be used to conduct environmental analyses, industrial monitoring, color measurements, and pharmacological studies.

A light spectrum can be measured in different ways, such as through direct measurement or indirect measurement. As an example, a spectrometer configured for direct measurement can separate different wavelengths of light spatially (e.g., using wavelength dispersive devices, such as diffractive gratings or prisms), and measure the power distribution of each wavelength of light individually (e.g., to "directly" measure the spectrum with respect to specific wavelengths).

As another example, a spectrometer configured for indirect measurement can modulate light according to a series of known spectral modulation patterns, and obtain measurements of the modulated light. Each measurement provides information carried by multiple wavelengths and according to different weights, and can be used to reconstruct the spectrum of the original light (e.g., using a multiplexing technique).

SUMMARY

A spectrometer system can be used to determine information regarding a sample (e.g., an object) based on the properties of light reflected from and/or transmitted through the sample. As an example, a spectrometer system can include a light source that emits light (e.g., light having known spectral properties) toward the sample, and a detector that measures light reflected from and/or transmitted through the sample. The spectrometer system can determine the spectral properties of the reflected and/or transmitted light (e.g., the distribution of light with respect to a range of wavelengths), and determine information regarding the sample based on these measurements. As an example, the spectrometer system can determine the physical shape or profile of the sample, the characteristics of the surface of the sample, and/or the composition of the sample.

In some implementations, a spectrometer system can measure light according to a specific wavelength or range of wavelengths. This can be useful, for example, as light measurements with respect to certain wavelengths or ranges of wavelengths may be particularly useful in determining the properties of the sample (e.g., compared to light measurement with respect to other wavelengths or ranges of wavelengths). Accordingly, the spectrometer system can selectively measure light within specific wavelengths or ranges of wavelengths (e.g., those that provide more information and/or more desirable information regarding the sample), while not measuring light within other wavelengths or ranges of wavelengths (e.g., those that provide less information and/or less desirable information regarding the sample) to improve the efficiency and accuracy of measurements.

In some implementations, a spectrometer system can measure light according to a specific wavelength or range of wavelengths using an interferometer. An interferometer is a device that uses light interference (e.g., by super-positioning light waves) to extract information from the light. As an example, an interferometer can receive reflected and/or transmitted light from a sample, and through a super-positioning of the received light according to different phases, selectively transmit a subset of the light having a particular wavelength or range of wavelengths to the detector for measurement. Accordingly, the detector does not measure the entirety of the light received from the sample, but rather a limited subset of the received light that is selectively transmitted by the interferometer.

In some implementations, an interferometer can be "tunable," such that a system or user can specify a particular wavelength or ranges of wavelengths of light that is transmitted by the interferometer for measurement. As an example, the output of a tunable interferometer can depend on an input voltage that is applied to the interferometer. The input voltage can be varied to adjust the wavelength or range of wavelengths of light that is selectively transmitted by the interferometer to the detector for measurement.

However, in some implementations, the output of an interferometer can also depend on other factors, such as the temperature of the surrounding environment. Further, the output of an interferometer can vary over the lifetime of the interferometer. As an example, the output of an interferometer can vary due to oxidation of one or more components (e.g., a mirror of the interferometer), which can alter the performance of the interferometer over time (e.g., cause a drift in the nominal central nominal wavelength outputted by the interferometer, alter the effective length of the cavity of the interferometer, etc.). As another example, water-intake in materials of the interferometer over time can create additional strain to components of the interferometer, causing physical changes that can alter the performance of the interferometer over time (e.g., bending due to increased volume). As another example, some material may lose volume over time, resulting in a change in the mechanical disposition of the interferometer and a corresponding change in performance.

Accordingly, in response to a particular input voltage, an interferometer may output light within different wavelengths or ranges of wavelengths (e.g., due to temperature fluctuations in the surrounding environment, the age of the device, etc.). These variations can reduce the accuracy and/or precision of a spectrometer system's measurements, particularly when the spectrometer system is used in different environments and/or in an unregulated environment.

To enhance its performance, the spectrometer system can calibrate the input voltage of the interferometer to account for these variations. As an example, the spectrometer system can emit light towards the interferometer (e.g., using an internal light source), measure the intensity of light reflecting from the interferometer (e.g., using a photodetector), and calibrate the input voltage of the interferometer based on the measurements.

The intensity of light reflecting from the interferometer can vary depending on the characteristics of the emitted light and the transmission characteristics of the interferometer. For instance, if the light source emits light according to a particular wavelength or range of wavelengths, and the interferometer is tuned to transmit light according to that wavelength or range of wavelengths, the light reflecting from the interferometer will be relatively lower (e.g., as the emitted light is substantially transmitted through the interferometer, rather than reflected from the interferometer). However, if the light source emits light according to a particular wavelength or range of wavelengths, and the interferometer is tuned to transmit light according to a different wavelength or range of wavelengths, the light reflecting from the interferometer will be relatively higher (e.g., as the emitted light is not substantially transmitted through the interferometer).

Accordingly, the spectrometer can sweep the input voltage of the interferometer across a range of voltages, while concurrently emitting light towards the interferometer and measuring the intensity of reflected light. Based on the measurements, the spectrometer can determine a relationship between the input voltage of the interferometer and the resulting wavelength or range of wavelengths of light that is outputted by the interferometer (e.g., corresponding to a measured decrease in intensity of reflected light). The spectrometer can calibrate the input voltage based on this relationship (e.g., by modifying an applied input voltage such that the output of the interferometer is more accurately controlled).

In some implementations, this self-calibration technique enables the spectrometer system to compensate for fluctuations in temperature and performance, and enables the spectrometer system to make more accurate and/or precise measurements. Further, this self-calibration technique can enable the spectrometer system to be used in a wider range of environments and environmental conditions, and extends the effective operational lifetime of the spectrometer system.

In an aspect, a system includes a housing defining a cavity and an aperture, a photodetector disposed within the cavity, a voltage-tunable interferometer disposed within the cavity between the aperture and the photodetector, a first light source disposed within the cavity, and an electronic control device. The electronic control device is operable to vary an input voltage applied to the interferometer, and concurrently with varying the input voltage applied to the interferometer, cause the first light source to emit light towards the interferometer, and measure light reflected from the interferometer using the photodetector. The electronic control device is also operable to determine, based on light reflected from the interferometer and measured by the photodetector, a calibrated input voltage. The electronic control device is operable to apply the calibrated input voltage to the interferometer, and concurrently with applying the calibrated input voltage to the interferometer, obtain one or more spectral measurements using the photodetector.

Implementations of this aspect can include one or more of the following features.

In some implementations, the electronic control device can be operable to determine the calibrated input voltage by determining a value of the input voltage corresponding to a minimum intensity of the measured light reflected from the interferometer.

In some implementations, the electronic control device can be operable to determine the calibrated input voltage by determining that the value of the input voltage corresponding to the minimum intensity of the measured light reflected from the interferometer is the calibrated input voltage.

In some implementations, the first light source can include a plurality of light emitting elements.

In some implementations, the electronic control device can be operable to cause the first light source to emit light towards the interferometer by causing the plurality of light emitting elements to emit light in a sequence.

In some implementations, the electronic control device can be operable to cause the first light source to emit light towards the interferometer by causing the plurality of light emitting elements to emit light concurrently.

In some implementations, the first light source can include one or more vertical-cavity surface-emitting laser (VCSEL) emitters.

In some implementations, the interferometer can include a Fabry-Perot interferometer (FPI).

In some implementations, the system can include a second light source disposed outside of the cavity. The electronic control device can be operable to obtain the one or more spectral measurements by causing the second light source to emit sample light towards a subject, and measuring, using the photodetector, sample light reflected from the subject.

In some implementations, the first light source can be operable to emit light within a first range of wavelengths. The second light source can be operable to emit light within a second range of wavelengths. The first range of wavelengths can be different from the second range of wavelengths.

In some implementations, the first range of wavelengths can be narrower than the second range of wavelengths.

In some implementations, the system can include a host device. The housing, the photodetector, the interferometer, the light source, and the electronic control device can be disposed, at least in part, in the host device.

In some implementations, the host device can be at least one of a smart phone or a wearable device.

In another aspect, a method includes varying an input voltage applied to a voltage-tunable interferometer, and concurrently with varying the input voltage applied to the interferometer, emitting light towards the interferometer and measuring light reflected from the interferometer. The method also includes determining, based on the measured light reflected from the interferometer, a calibrated input voltage. The method also includes applying the calibrated input voltage to the interferometer, and concurrently with applying the calibrated input voltage to the interferometer, obtaining one or more spectral measurements using the photodetector, Implementations of this aspect can include one or more of the following features.

In some implementations, determining the calibrated input voltage can include determining a value of the input voltage corresponding to a minimum intensity of the measured light reflected from the interferometer.

In some implementations, determining the calibrated input voltage can include determining that the value of the input voltage corresponding to the minimum intensity of the measured light reflected from the interferometer is the calibrated input voltage.

In some implementations, emitting light towards the interferometer can include emitting light by a plurality of light emitting elements in a sequence.

In some implementations, emitting light towards the interferometer can include emitting light by a plurality of light emitting elements concurrently.

In some implementations, obtaining the one or more spectral measurements can include emitting sample light towards a subject, and measuring sample light reflected from the subject.

In some implementations, the light can be within a first range of wavelengths, the sample light can be within a second range of wavelengths. The first range of wavelengths can be different from the second range of wavelengths.

In some implementations, the first range of wavelengths can be narrower than the second range of wavelengths.

The details of one or more implementations are set forth in the accompanying drawings and the description below. Other features and advantages will be apparent from the description and drawings, and from the claims.

DETAILED DESCRIPTION

This disclosure describes implementations of a spectrometer system for measuring the spectral distribution of light reflected from and/or transmitted through a sample. Implementations of the spectrometer system include a voltage-tunable interferometer for selecting particular wavelengths or ranges of wavelengths of light for measurement. To account for variations in the output of the interferometer (e.g., due to fluctuations in the ambient temperature, the age of the system, etc.), the spectrometer system can self-calibrate the input voltage that is applied to the interferometer. In some implementations, this enables the spectrometer system to compensate for variations in operation, and enables the spectrometer system to make more accurate and/or precise measurements. Further, this self-calibration technique can enable the spectrometer system to be used in a wider range of environments and environmental conditions, and extends the effective operational lifetime of the spectrometer system.

Figure 1:
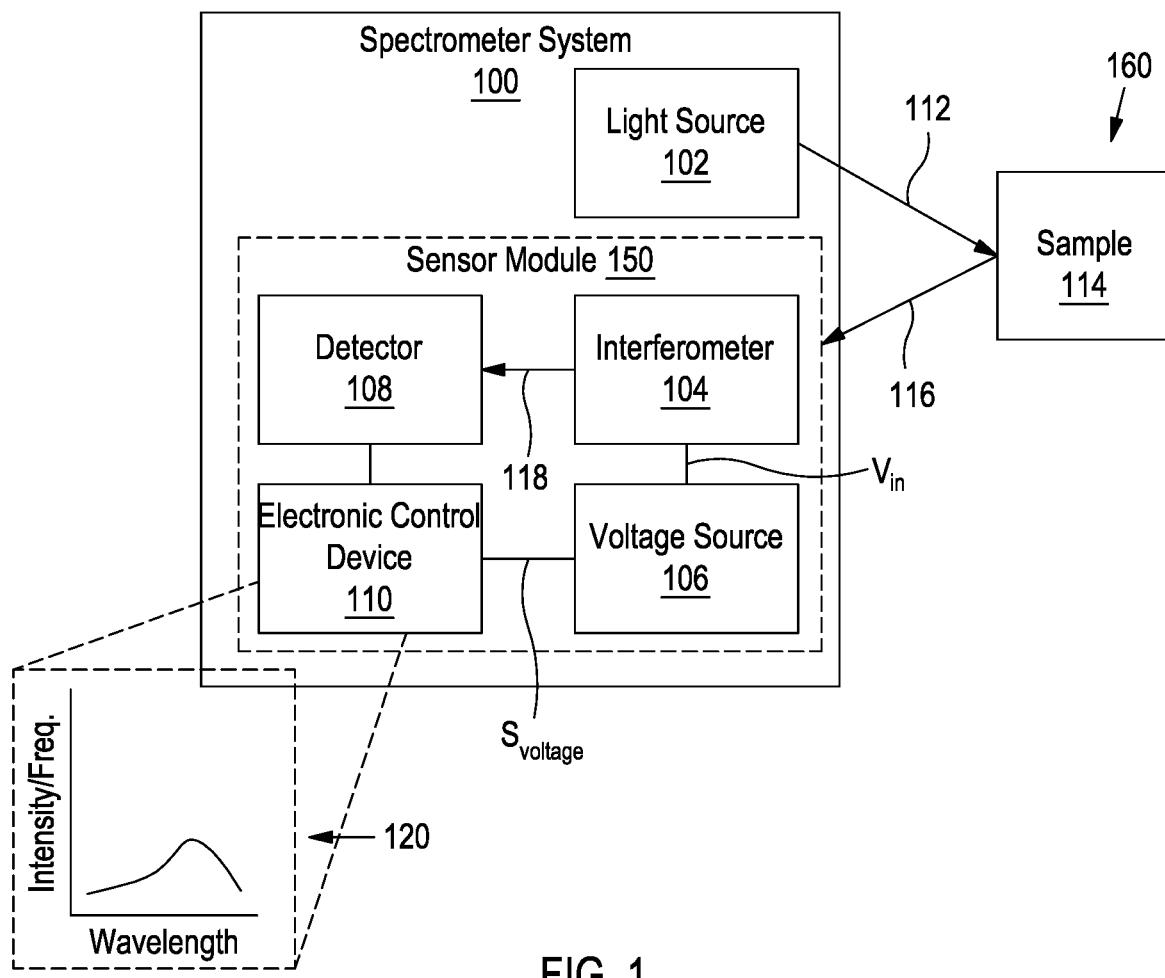
FIG. 1 is schematic diagram of an example spectrometer system.

FIG. 1 shows an example spectrometer system 100. The spectrometer system 100 can be implemented as a stand-alone device (e.g., as an individual instrument), or as part of another device (e.g., as a part of a multi-purpose device). In some implementations, the spectrometer system 100 can be implemented as a part of a mobile device, such as a smart phone, a tablet computer, or a wearable computer.

As shown in FIG. 1, the spectrometer system 100 includes a light source 102 and a sensor module 150 having an interferometer 104, a voltage source 106, a detector 108, and an electronic control device 110. In an example usage of the spectrometer system 100, the light source 102 generates light 112, which is emitted towards a sample 114 (e.g., an object positioned in a sample region 160). At least some of the sample light 116 reflected by and/or transmitted through the sample 114 becomes incident on the interferometer 104. Based on an input voltage generated by the voltage source 106, the interferometer 104 selectively transmits a subset of the sample light 118 (e.g., sample light within a particular wavelength or range of wavelengths) to the detector 108. The detector 108 measures the characteristics of the subset of the sample light 118, and provides the measurements to the electronic control device 110. Based on the measurements, the electronic control device 110 determines information regarding the sample 114 (e.g., a histogram 120 representing the spectral distribution of the subset of the sample light 118, characteristics of the sample 114, etc.).

The light source 102 is a component operable to generate light and emit the light toward the sample region 160. The light source 102 can include one or more light emitting elements. As an example, the light source 102 can include one or more light emitting diodes (LEDs), vertical cavity surface emitting lasers (VCSELs), organic light emitting diodes (OLEDs), or other devices that selectively generate light.

The interferometer 104 is a component operable to extract information from light using light interference. As an example, the interferometer can receive the sample light 116, and through a super-positioning of the sample light 116 according to different phases, selectively transmit the subset of the sample light 118 having a particular wavelength or range of wavelengths to the detector 108 for measurement. The interferometer 104 is "tunable," such that a system or user can specify a particular wavelength or ranges of wavelengths of light that is transmitted by the interferometer 104 to the detector 108. As an example, the output of the interferometer 104 can depend on an input voltage $V_{in}$ that is generated by the voltage source 106 and applied to the interferometer 104. The input voltage $V_{in}$ can be varied to adjust the wavelength or range of wavelengths of light that is selectively transmitted by the interferometer 104 to the detector 108. In some implementations, the interferometer 104 can include one or more micro-electro-mechanical systems (MEMS)-based tunable Fabry-Perot (FI) interferometers.

The voltage source 106 is a component operable to generate the input voltage $V_{in}$. The voltage source 106 can include one or more digital and/or analog circuit components for generating voltage. In some implementations, the voltage source 106 can include one or more batteries or electric generators. In some implementations, the voltage source 106 can receive electric energy from an external source (e.g., an external power supply), and generate the input voltage $V_{in}$ using the received electric energy. In some implementations, the voltage source 106 can be communicatively coupled to the electronic control device 110, and can generate an input voltage $V_{in}$ having a particular voltage value based on command signals $S_{voltage}$ received from the electronic control device 110. Although FIG. 1 depicts the voltage source 106 as a part of the sensor module 150, in some implementations, the voltage source 106 can be implemented as a separate component (e.g., as a part of the spectrometer system 100 or another device).

The detector 108 is a component operable to measure the characteristics of the subset of sample light 118 received form the interferometer 104. In some implementations, the detector 108 can include one or more photodetectors or other light sensitive sensors. The detector 108 can measure various characteristics of the subset of sample light 118. As an example, the detector 108 can measure the intensity of the light and/or the spectral characteristics of the reflected light with respect to certain wavelengths and/or ranges of wavelengths. In some implementations, the detector 108 is operable to measure the subset of sample light 118 according to one or more discrete points in time. In some implementations, the detector 108 is operable to measure light continuously, periodically, intermittently, or according to some other pattern.

The electronic control device 110 is a component operable to control one or more functions of the spectrometer system 100. For example, the electronic control device 110 can be communicatively coupled to the light source 102, and can send command signals to the light source 102 to selectively turn on or off the light source 102 (e.g., to generate light during selected periods of time, such as during a measurement operation) and/or specify the characteristics of the generated light (e.g., to generate light according to a specific pattern, spectral composition, etc.). As another example, the electronic control device 110 can be communicatively coupled to the voltage source 106, and can send command signals $S_{voltage}$ to the voltage source 106 to generate an input voltage $V_{in}$ having a particular voltage value (e.g., to tune the output of the interferometer 104). As another example, the electronic control device 110 can be communicatively coupled to the detector 108, and can obtain measurements from the detector 108.

Further, the electronic control device 110 can determine information from the sample 114 based on the measurements. For example, the electronic control device 110 can generate a histogram 120 representing the spectral distribution of the subset of the sample light 118. As another example, the electronic control device 110 can determine other characteristics of the sample 114 based on the measurements, such as the physical shape or profile of the sample, the characteristics of the surface of the sample, and/or the composition of the sample.

In some implementations, the electronic control device 110 can be implemented in conjunction with one or more of the other components of the spectrometer system 100 and/or the sensor module 150 (e.g., as a single integrated device). In some implementations, the electronic control device 110 can be implemented as a device separate from one or more of the other components of the spectrometer system 100 and/or the sensor module 150. For example, the electronic control device 110 can be a computer system (e.g., a client computer system or a server computer system) or computer processor separate and distinct from one or more of the other components of the spectrometer system 100 and/or the sensor module 150.

As described above, the output of the interferometer 104 can depend on the input voltage $V_{in}$ that is applied to the interferometer 104. The input voltage $V_{in}$ can be varied to adjust the wavelength or range of wavelengths of light that is selectively transmitted by the interferometer 104 to the detector 108.

In some implementations, the relationship between the input voltage $V_{in}$ applied to an interferometer and the corresponding wavelength of light outputted by the interferometer is non-linear. For instance, FIG. 2A includes a plot 200 showing a relationship between the input voltage $V_{in}$ applied to the interferometer 104 and the corresponding wavelength of light outputted by the interferometer 104 for a spectrometer system including an example MEMS-based tunable FP interferometer. In this example, applying an input voltage $V_{in}$ to the interferometer 104 would result in the output of light having a range of wavelengths with a center wavelength of approximately 1550 nm, while other wavelengths of light outside of the range are substantially not output by the interferometer. In this example, the relationship can be approximated by the equation:

$$V^2 = \left[\frac{2k}{\varepsilon_0 \varepsilon_\alpha A} x(T-x)^2\right]$$

where k is a spring constant, x is the wavelength change (e.g., a displacement of the cavity of the interferometer), $\varepsilon_O$ is the vacuum permittivity, $\varepsilon_\alpha$ is that relative static permittivity, A is the area of the equal parallel plates of the interferometer, V is the voltage applied between the electrodes, and T is a parameter related to the geometry and the electrical permittivity of the media under consideration $$\left(\text{e.g., } T = g - t_d\left(1 - \frac{\varepsilon_a}{\varepsilon_b}\right)\right),$$

where g is a thickness of the cavity with no applied voltage, and $t_d$ is the thickness of the layer on top of the electrode, with a relative static permittivity of $\varepsilon_b$).

However, in some implementations, the output of an interferometer can also depend on the temperature of the surrounding environment. Accordingly, in response to a particular input voltage, an interferometer may output light within different wavelengths or ranges of wavelengths due to temperature fluctuations in the surrounding environment. These variations can reduce the accuracy and/or precision of a spectrometer system's measurements, particularly when the spectrometer system is used in different environments and/or in an unregulated environment. For example, although an electronic control device 110 may specify that a certain wavelength of light be transmitted to the detector 108 for measurement, a different wavelength of light might be transmitted instead, resulting in variations in the measurements and/or errors in the interpretation of those measurements.

Figure 2A:
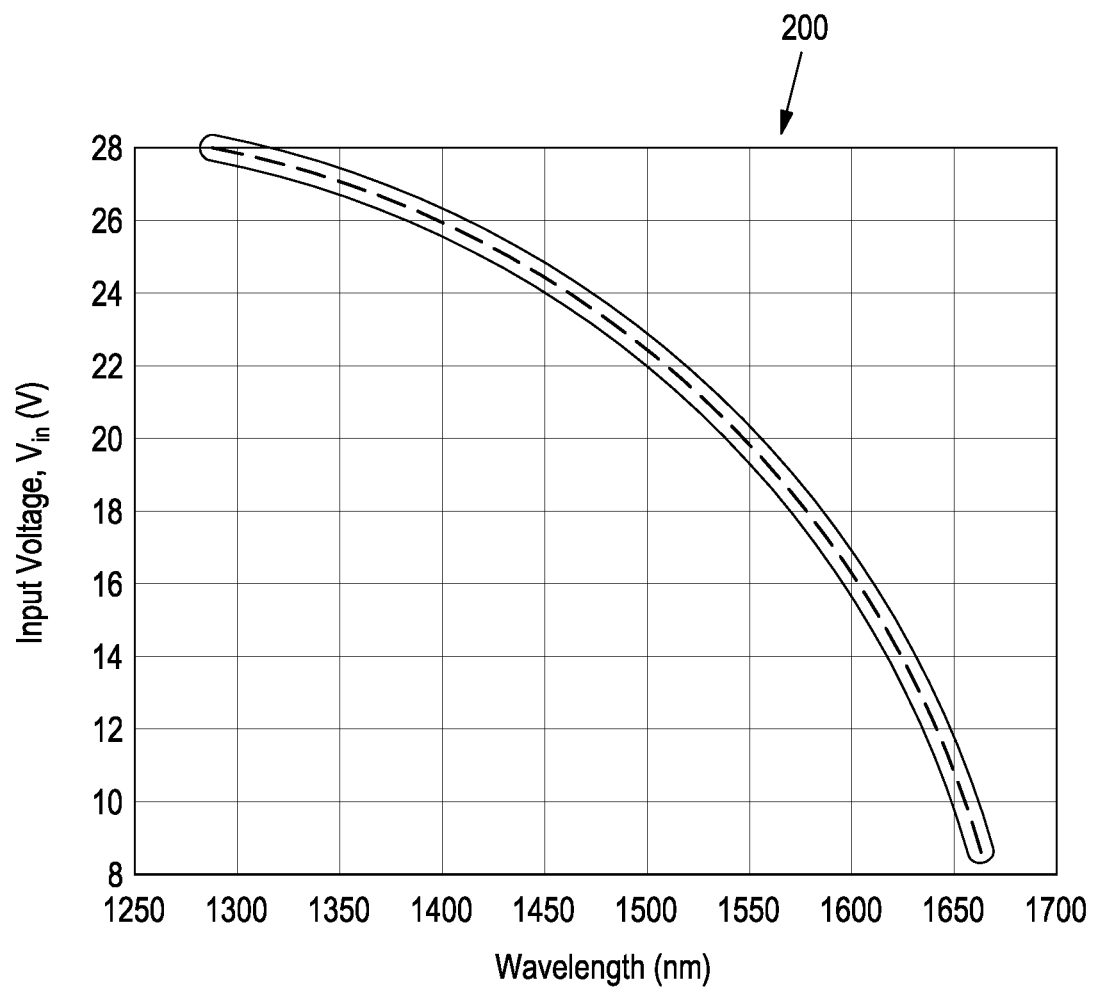
FIG. 2A is a plot showing an example relationship between the input voltage applied to an interferometer and a corresponding wavelength of light outputted by the interferometer.
Figure 2B:
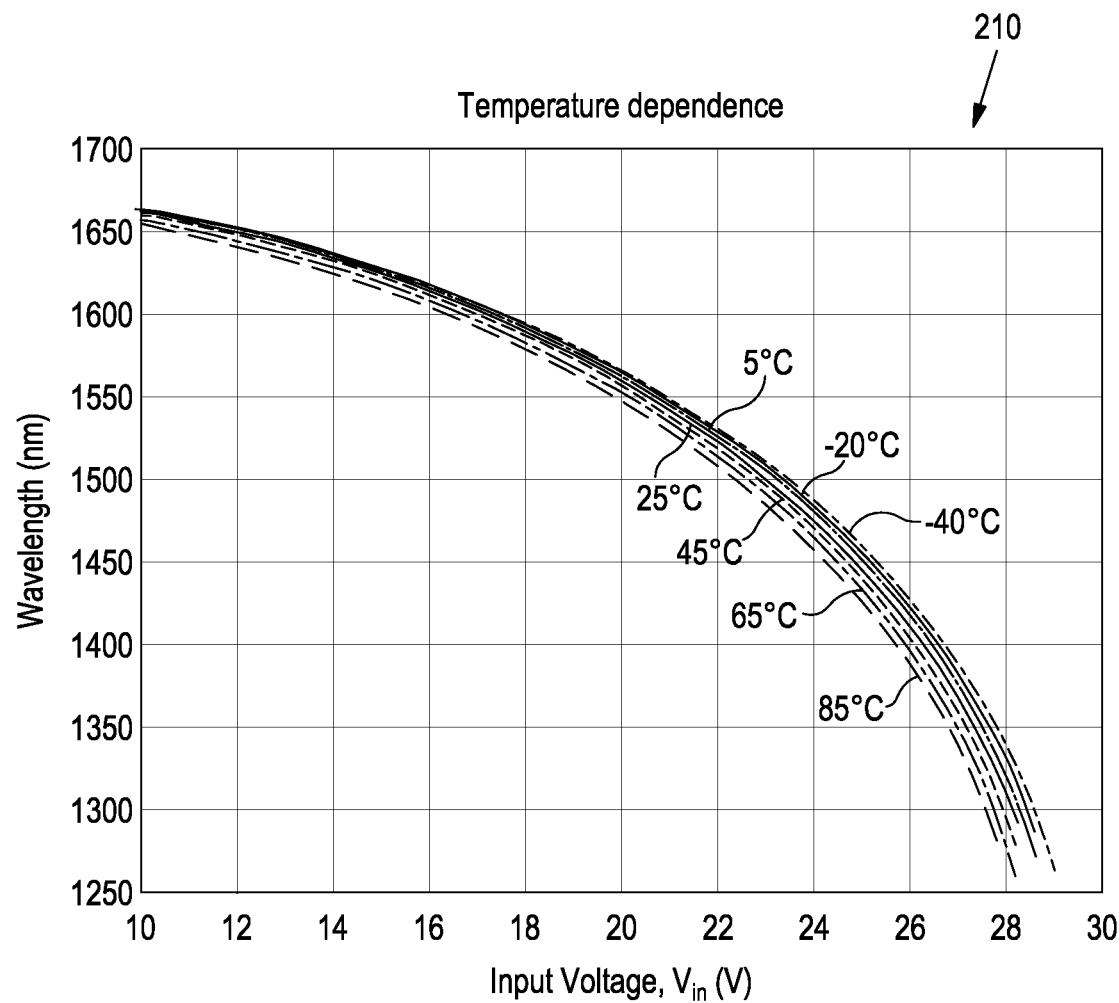
FIG. 2B is a plot showing an example relationship between the input voltage applied to an interferometer and a corresponding wavelength of light outputted by the interferometer with respect to several different temperatures.

As an example, FIG. 2B shows a plot 210 depicting a relationship between (i) the input voltage Vin applied to the interferometer 104, and (ii) the corresponding center wavelength of the range of wavelengths of light outputted by the interferometer 104 with respect to 7 different temperatures ranging from −40° C. and 85° C. (−40° C., −20° C., 5° C., 25° C., 45° C., 65° C., and 85° C.). As shown in FIG. 2B, in response to a particular input voltage $V_{in}$, an interferometer may output light within different ranges of wavelengths, depending on the temperature. Thus, the resulting measurements may vary due to temperature fluctuations during and between each measurement.

Further, in some implementations, the output of an interferometer can vary over the lifetime of the interferometer. For example, as the interferometer ages, the relationship between the input voltage $V_{in}$ applied to the interferometer 104 and the corresponding center wavelength of the range of wavelengths of light outputted by the interferometer 104 can shift or "drift." Thus, the resulting measurements may vary due to the age of the device.

Figure 3:
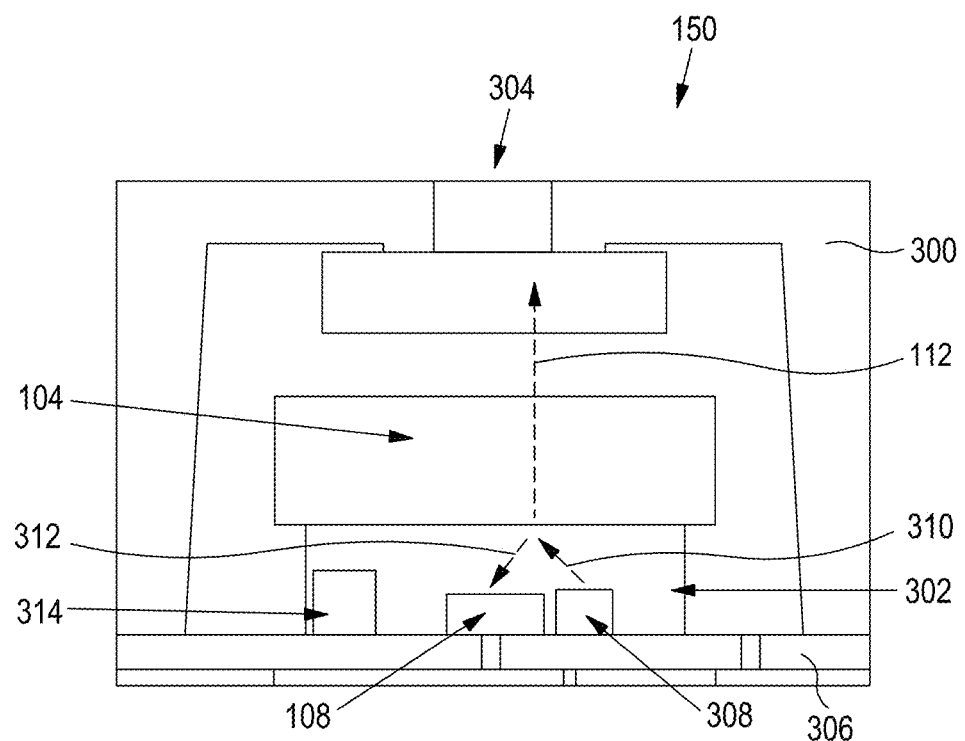
FIG. 3 is a diagram of an example sensor module.

To enhance its performance, the spectrometer system can self-calibrate the input voltage $V_{in}$ that is applied to the interferometer 104 to account for these variations. An example sensor module 150 for performing self-calibrations is shown in FIG. 3.

The sensor module 150 includes a housing 300 defining a cavity 302 and an aperture 304. Some or all of the components of the sensor module 150 shown in FIG. 3 can be similar to those shown in FIG. 1. For example, the sensor module 150 can include a detector 108 disposed within the cavity 302 (e.g., on a substrate 306), and an interferometer 104 disposed within the cavity between the aperture 304 and the detector 108 (e.g., on the substrate 306). In an example operation of the sensor module 150, a light source (e.g., the light source 102 described with respect to FIG. 1) emits light towards a sample (e.g., the sample 114 described with respect to FIG. 1). At least some of the light reflected by and/or transmitted through the sample travels through the aperture 304 and becomes incident on the interferometer 104. Based on an input voltage generated by a voltage source (e.g., the voltage source 106 described with respect to FIG. 1), the interferometer 104 selectively transmits a subset of the sample light (e.g., sample light within a particular wavelength or range of wavelengths) to the detector 108. The detector 108 measures the characteristics of the subset of the sample light, and provides the measurements to an electronic control device (e.g., the electronic control device 110 described with respect to FIG. 1). Based on the measurements, the electronic control device determines information regarding the sample (e.g., a histogram representing the spectral distribution of the subset of the sample light, characteristics of the sample, etc.).

The sensor module 150 also includes an internal light source 308 and a temperature-sensitive sensor 314 positioned within the cavity 302 (e.g., on the substrate 306) to facilitate self-calibration.

The temperature-sensitive sensor 314 outputs a varying measurement signal depending on the surrounding temperature (e.g., a temperature within the cavity 302). As an example, the temperature-sensitive sensor 314 can include one or more temperature-sensitive thermistors.

The internal light source 308 is a component operable to generate light and emit the light toward the interferometer 104. The internal light source 308 can include one or more light emitting elements. As an example, the internal light source 308 can include one or more light emitting diodes (LEDs), vertical cavity surface emitting lasers (VCSELs), organic light emitting diodes (OLEDs), or other devices that selectively generate light. In some implementations, the internal light source 308 can emit light according to a particular wavelength or range of wavelengths $\lambda_{emission}$. In some implementations, the internal light source 308 can emit light according to a relatively narrow range of wavelengths (e.g., a range of less than 1 nm). In some cases, the internal light source 308 can emit light according to a narrower range of wavelengths compared to that of the light source 102.

In some implementations, the internal light source 308 can emit light based on measurement signals from the temperature-sensitive sensor 314 (e.g., to account for temperature-dependent variations in the wavelength or range of wavelengths $\lambda_{emission}$)—As an example, the emission of a VCSEL-based internal light source 308 might vary by a particular amount based on temperature (e.g., about 0.07 nm/° C.). The electronic control device 110 can determine the temperature of the cavity 302 based on the temperature-sensitive sensor 314, and tune the internal light source 308 such that the desired wavelength or range of wavelengths of light are emitted.

In an example self-calibration process of the sensor module 150, the sensor module 150 emits light 310 towards the interferometer 104 using the internal light source 308, and measures the intensity of light 312 reflected from the interferometer 104 using the detector 108. The sensor module 150 calibrates the input voltage $V_{in}$ that is applied to the interferometer based on the measurements.

Figure 4A:
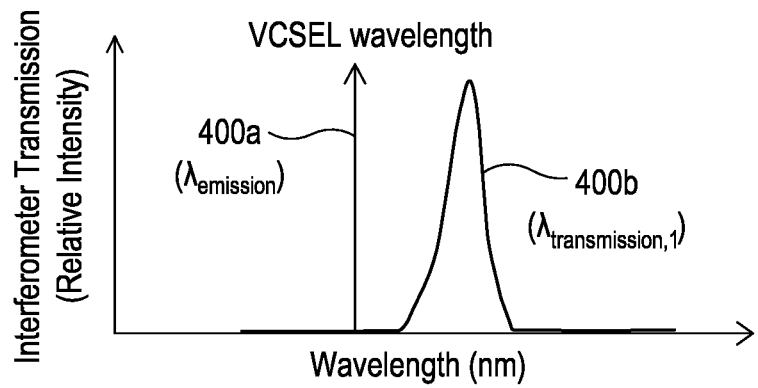
FIG. 4A includes plots depicting the range of wavelengths of light outputted by an internal light source of a sensor module and a range of wavelength of light transmitted by an interferometer of the sensor module.

The intensity of light 312 reflecting from the interferometer 104 can vary depending on the characteristics of the emitted light 310 and the transmission characteristics of the interferometer 104. As an example, FIG. 4A shows a plot 400a depicting the range of wavelengths of light $\lambda_{emission}$ outputted by the internal light source 308 and a plot 400b depicting a first range of wavelength of light $\lambda_{emission,1}$ transmitted by the interferometer 104 (e.g., corresponding to a first input voltage $V_{in,1}$ applied to the interferometer 104). In this example, the ranges of wavelengths substantially do not coincide (e.g., $\lambda_{emission}$ is substantially outside of the range of $\lambda_{transmission,1}$)—Accordingly, the measured intensity of light reflected from the interferometer 104 will be relatively higher (e.g., as the emitted light is not substantially transmitted through the interferometer 104).

Figure 4B:
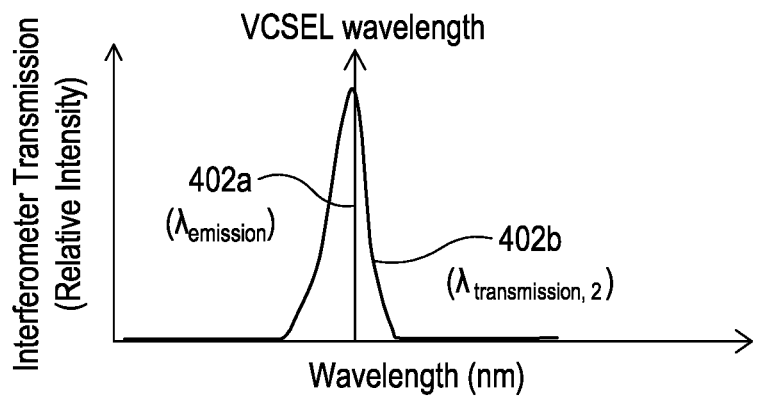
FIG. 4B includes further plots depicting the range of wavelengths of light outputted by an internal light source of a sensor module and a range of wavelength of light transmitted by an interferometer of the sensor module.

As another example, FIG. 4B shows a plot 402a depicting the range of wavelengths of light $\lambda_{emission}$ outputted by the internal light source 308 and a plot 402b depicting a second range of wavelength of light $\lambda_{emission,2}$ transmitted by the interferometer 104 (e.g., corresponding to a second input voltage $V_{in,2}$ applied to the interferometer 104). In this example, the ranges of wavelengths substantially coincide (e.g., $\lambda_{emission}$ is substantially within the range of $\lambda_{transmission,2}$). Accordingly, the measured intensity of light reflected from the interferometer 104 will be relatively lower (e.g., as the emitted light is substantially transmitted through the interferometer, rather than reflected from the interferometer).

The sensor module 150 can sweep the input voltage $V_{in}$ applied to the interferometer 104 across a range of voltages, while concurrently emitting light 310 towards the interferometer 104 and measuring the intensity of reflected light 312. Based on the measurements, the sensor module 150 can determine a relationship between the input voltage $V_{in}$ of the interferometer 104 and the resulting wavelength or range of wavelengths of light that is outputted by the interferometer 104 (e.g., corresponding to a measured decrease in intensity or minimal intensity of reflected light 312). The sensor module 150 can calibrate the input voltage $V_{in}$ based on this relationship (e.g., by modifying an applied input voltage such that the output of the interferometer is more accurately controlled).

Figure 4C:
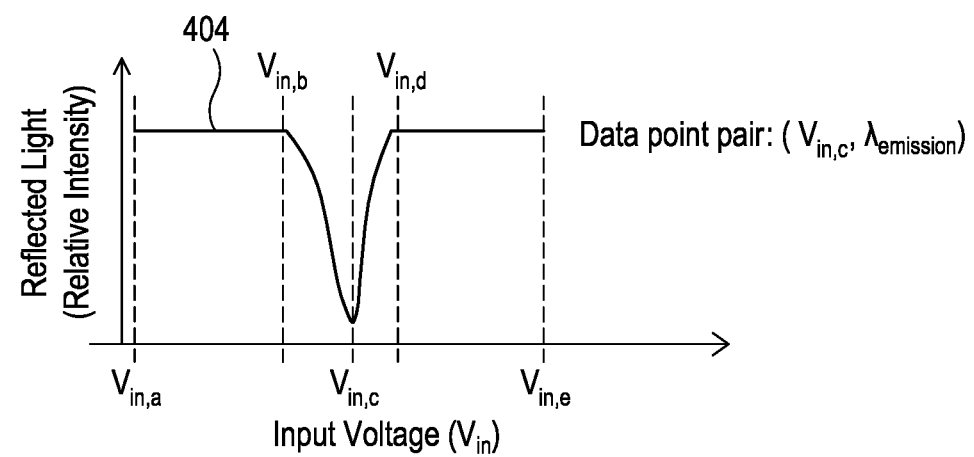
FIG. 4C includes a plot of a measured intensity of reflected light with respect to a swept range of input voltages for a sensor module.

As an example, FIG. 4C shows a plot 404 of the measured intensity of reflected light 312 with respect to a swept range of input voltages $V_{in}$. The measured intensity of reflected light 312 is relatively high when the input voltage is between $V_{in,a}$ and $V_{in,b}$. However, the measured intensity of reflected light 312 begins decreasing when the input voltage begins to exceed $V_{in,b}$, and is at a minimum when the input voltage is $V_{in,c}$. The measured intensity of reflected light 312 begins increasing when the input voltage begins exceeding $V_{in,c}$, and is again relatively high when the input voltage is between $V_{in,d}$ and $V_{in,e}$.

The input voltage $V_{in,c}$ corresponds to the maximal transmittance of the interferometer (e.g., coinciding with the resonant frequency of the interferometer). If the wavelength or range of wavelengths of the emitted light 312 are known (e.g., $\lambda_{emission}$), then a relationship can be established between the input voltage $V_{in,c}$ and the wavelength or range of wavelengths $\lambda_{mission}$ (e.g., an input voltage/output wavelength data point pair ($V_{inc}$, $\lambda_{emission}$)). In practice, this signifies that, when an input voltage $V_{in,c}$ is applied to the interferometer 104, the interferometer transmits light according to a wavelength or range of wavelengths $\lambda_{emission}$.

In some implementations, the sensor module 150 can perform a self-calibration based on a single data point pair. For example, the electronic control device 110 can instruct the internal light source 308 to emit light towards the interferometer 104 according to a single wavelength or range of wavelengths $\lambda_{emission}$ Concurrently with the emission of light, the electronic control device 100 can instruct the voltage source 106 to apply a sweeping range of input voltages $V_{in}$ to the interferometer, and measure the intensity of reflecting light using the detector 108. The electronic control device 110 can determine a data point pair indicating (i) the input voltage $V_i$ corresponding to a minimum intensity of measured reflected light, and (ii) the wavelength or range of wavelengths of light $\lambda_{emission}$ emitted by the internal light source 308 (e.g., a data point pair ($V_i$, $\lambda_{emission}$)). Based on this determination, the electronic control device 110 can determine whether the output of the interferometer has deviated from its reference characteristics (e.g., by comparing the data point pair to one or more previously determined data point pairs or calibration look up tables, default settings programmed during the manufacturing processor, etc.), and adjust the input voltage based on the determination. For example, if the electronic control device 110 determines, based on data point pair, that a particular input voltage $V_{in}$ causes the interferometer to output a different wavelength or range of wavelengths of light than expected, the electronic control device 110 can adjust the input voltage during operation to account for the difference (e.g., increase or decrease the input voltage to achieve the desired output). Data regarding the calibration process (e.g., the data point pair, the input voltage adjustment, etc.) can be stored for future retrieval and use (e.g., in a data storage device).

In some implementations, the sensor module 150 can perform a self-calibration based on multiple data point pairs. For example, the electronic control device 110 can instruct the internal light source 308 to emit light towards the interferometer 104 according to a first wavelength or range of wavelengths $\lambda_{emission,1}$. Concurrently with the emission of light, the electronic control device 110 can instruct the voltage source 106 to apply a sweeping range of input voltages $V_{in}$ to the interferometer, and measure the intensity of reflecting light using the detector 108. The electronic control device 110 can determine a first data point pair indicating (i) a first input voltage $V_{i,1}$ corresponding to a minimum intensity of measured reflected light during the voltage sweep, and (ii) the first wavelength or range of wavelengths of light $\lambda_{emission,1}$ emitted by the internal light source 308 during the sweep (e.g., a data point pair ($V_{i,1}$, $\lambda_{emission,1}$)). The electronic control device 110 can repeat this process one or more times according to different wavelengths or ranges of wavelengths of emitted light to obtain additional data point pairs (e.g., in a data storage device).

Based on these data point pairs, the electronic control device 110 can determine whether the output of the interferometer has deviated from its reference characteristics (e.g., by comparing the data point pairs to one or more previously determined data point pairs or calibration look up tables, default settings programmed during the manufacturing processor, etc.), and adjust the input voltage based on the determination. For example, if the electronic control device 110 determines, based on data point pairs, that particular input voltages $V_{in}$ cause the interferometer to output different wavelengths or range of wavelengths of light than expected, the electronic control device 110 can adjust the input voltage during operation to account for the difference (e.g., increase or decrease the input voltage to achieve the desired output).

In some implementations, the electronic control device can calibrate an input voltage function based on the multiple data point pairs. An input voltage function can describe, for instance, a relationship between a given input voltage and a corresponding wavelength or range of wavelengths of light output by the interferometer (e.g., as depicted in FIGS. 2A and 2B). As an example, the electronic control device 110 can calibrate an input voltage function by performing a curve fitting with respect the input voltage function (e.g., using regression techniques, such as polynomial regression) using one or more of the data point pairs as fitting parameters. As another example, the electronic control device 110 can calibrate an input voltage function by shifting the input voltage function (e.g., with respect to the input voltage dimension and/or the output wavelength dimension) based on the one or more of the data point pairs. In some implementations, the electronic control device 110 can adjust a look up table based on the data point. A look up table can indicate, for example, a number of discrete input voltages and their corresponding wavelength or range of wavelengths of light output by the interferometer (e.g., in the form of a data table). Data regarding the calibration process (e.g., the data point pairs, the input voltage adjustment, the calibrated input voltage function, an adjusted look up label, etc.) can be stored for future retrieval and use (e.g., in a data storage device).

In some implementations, the electronic control device 110 can perform a self-calibration prior each spectral measurement. For example, the electronic control device 110 can perform a self-calibration using an internal light source 308, then apply a calibrated input voltage $V_{in}$ to the interferometer to conduct a spectral measurement with respect to a selected wavelength or range of wavelengths (e.g., using the light source 102). This can be beneficial, for example, in improving the precision and/or accuracy of the spectrometer system.

In some implementations, the electronic control device 110 can perform a self-calibration periodically during the course of operation. For example, the electronic control device 110 can perform a self-calibration using an internal light source 308 every N spectral measurements and/or once every time interval T. The electronic control 110 can subsequently apply a calibrated input voltage Vin to the interferometer to conduct one or more spectral measurement with respect to a selected wavelength or range of wavelengths (e.g., using the light source 102). This can be beneficial, for example, in improving the precision and/or accuracy of the spectrometer system (e.g., compared to not conducting any self-calibrations at all), while reducing the amount of time that is spent conducting the self-calibration process (e.g., compared to conducting a self-calibration prior to every spectral measurement).

Figure 5:
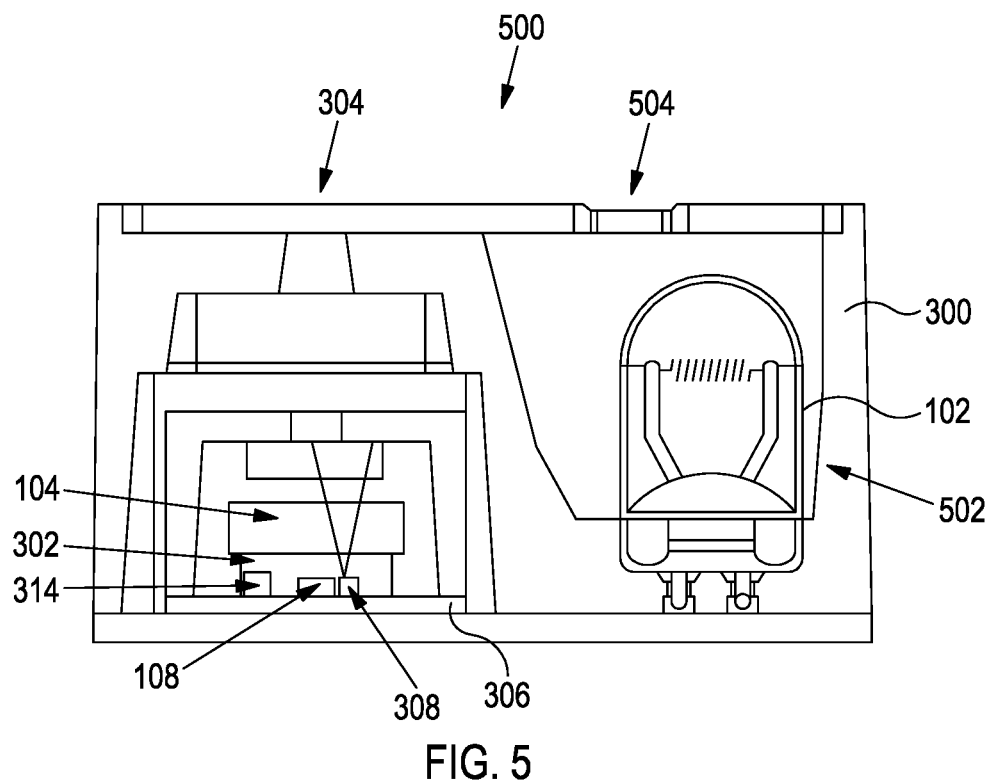
FIG. 5 is a diagram of another example sensor module.

In some implementations, the light source 102 can be integrated into the sensor module. As an example, FIG. 5 shows a sensor module 500. Aspects of the sensor module 500 can be similar to the sensor module 150 shown and described with respect to FIG. 3. For example, the sensor module 500 includes a housing 300 defining a cavity 302 and an aperture 304. The sensor module 500 also includes a detector 108 disposed within the cavity 302 (e.g., on a substrate 306), and an interferometer 104 disposed within the cavity between the aperture 304 and the detector 108 (e.g., on the substrate 306). The sensor module 500 also includes an internal light source 308 and a temperature-sensitive sensor 314 positioned within the cavity 302 (e.g., on the substrate 306) to facilitate self-calibration (e.g., as described with respect to FIGS. 3 and 4A-4C).

Further, the sensor module 500 includes a light source 102 disposed within a second cavity 502 of the housing 300. In an example operation of the sensor module 500, the light source 102 emits light towards a sample through a second aperture 504 of the housing 300. At least some of the light reflected by and/or transmitted through the sample returns to the sensor module 500 through the aperture 304, and becomes incident on the interferometer 104. Based on an input voltage generated by a voltage source (e.g., the voltage source 106 described with respect to FIG. 1), the interferometer 104 selectively transmits a subset of the sample light (e.g., sample light within a particular wavelength or range of wavelengths) to the detector 108. The detector 108 measures the characteristics of the subset of the sample light, and provides the measurements to an electronic control device (e.g., the electronic control device 110 described with respect to FIG. 1). Based on the measurements, the electronic control device determines information regarding the sample (e.g., a histogram representing the spectral distribution of the subset of the sample light, characteristics of the sample, etc.).

Figure 6:
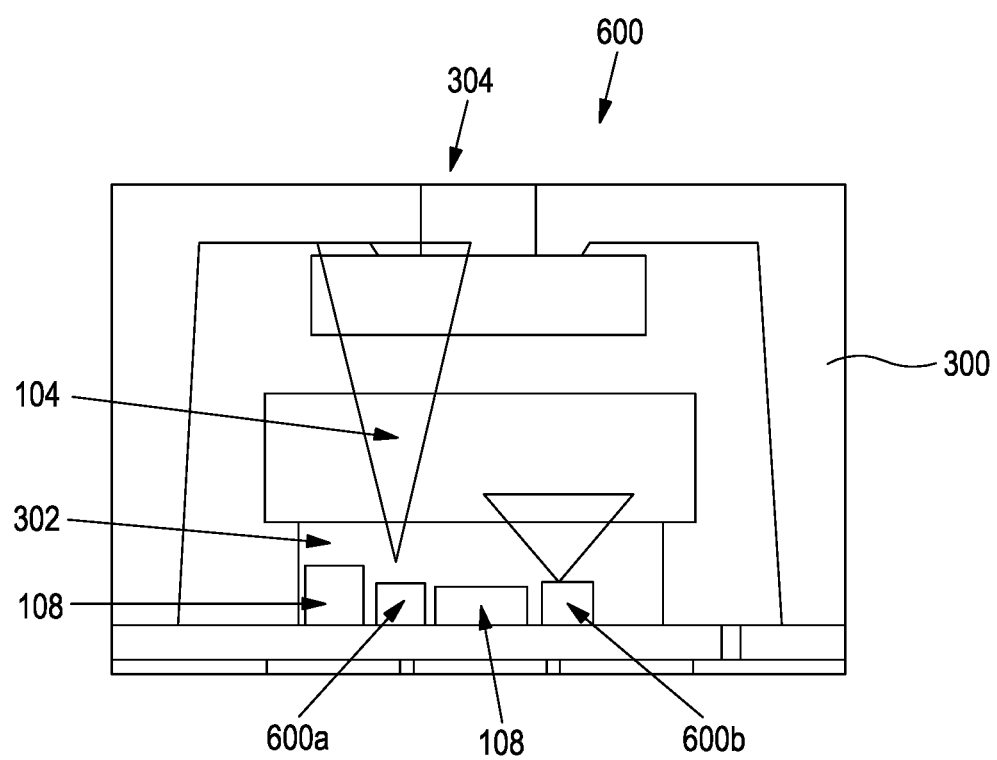
FIG. 6 is a diagram of another example sensor module.

In some implementations, a sensor module can include multiple internal light sources (e.g., multiple laser emitters, LEDs, etc.). At least some of the internal light sources can be configured to emit light according to different wavelengths or ranges of wavelengths than other internal light sources. This can be useful, for example, as it enables the sensor module 150 to perform self-calibration with respect to multiple different wavelengths or ranges of wavelengths. As an example, FIG. 6 shows a sensor module 600 having two internal light sources 600a and 600b disposed within a cavity 302 of the housing 300 (e.g., on the substrate 306). Although two internal light sources are shown in FIG. 6, in practice, a sensor module can include any number of internal light sources (e.g., one, two, three, four, or more).

In some cases, one or more of the internal light sources can be configured to emit light so as to increase or maximize the contrast signal at the detector. As an example, one or more of the light sources can include lenses or micro-lenses to direct light at the interferometer at a particular angle such that the reflected light is substantially incident upon the detector.

In some cases, the sensor module can be configured to emit light using multiple internal light sources in a sequence (e.g., to sweep across multiple different wavelengths or ranges of wavelengths of emitted light). This can be useful, for example, in reducing the peak power load of the sensor module (e.g., as not all of the internal light sources are emitting light simultaneously).

In some cases, the sensor module can be configured to emit light using multiple internal light sources concurrently (e.g., to emit light having multiple wavelengths or ranges of wavelengths concurrently). This can be useful, for example, in reducing the amount of time needed to perform the self-calibration process.

In some cases, the sensor module can be configured to detect when the sensor module has been damaged. For example, in a similar manner as described with respect to FIGS. 3 and 4A-4C, a sensor module can emit light towards an interferometer using an internal light source, and measure reflected light using a detector. If the measured reflected light is zero or substantially zero (e.g., across a range of swept input voltages), the sensor module can determine that the sensor module is damaged. This can occur, for example, if the internal light source, detector, and/or interferometer are damaged or otherwise comprised. The spectrometer system can indicate this damage to a user (e.g., via a display screen, indicator light, audio speaker, etc.).

Example Processes

Figure 7:
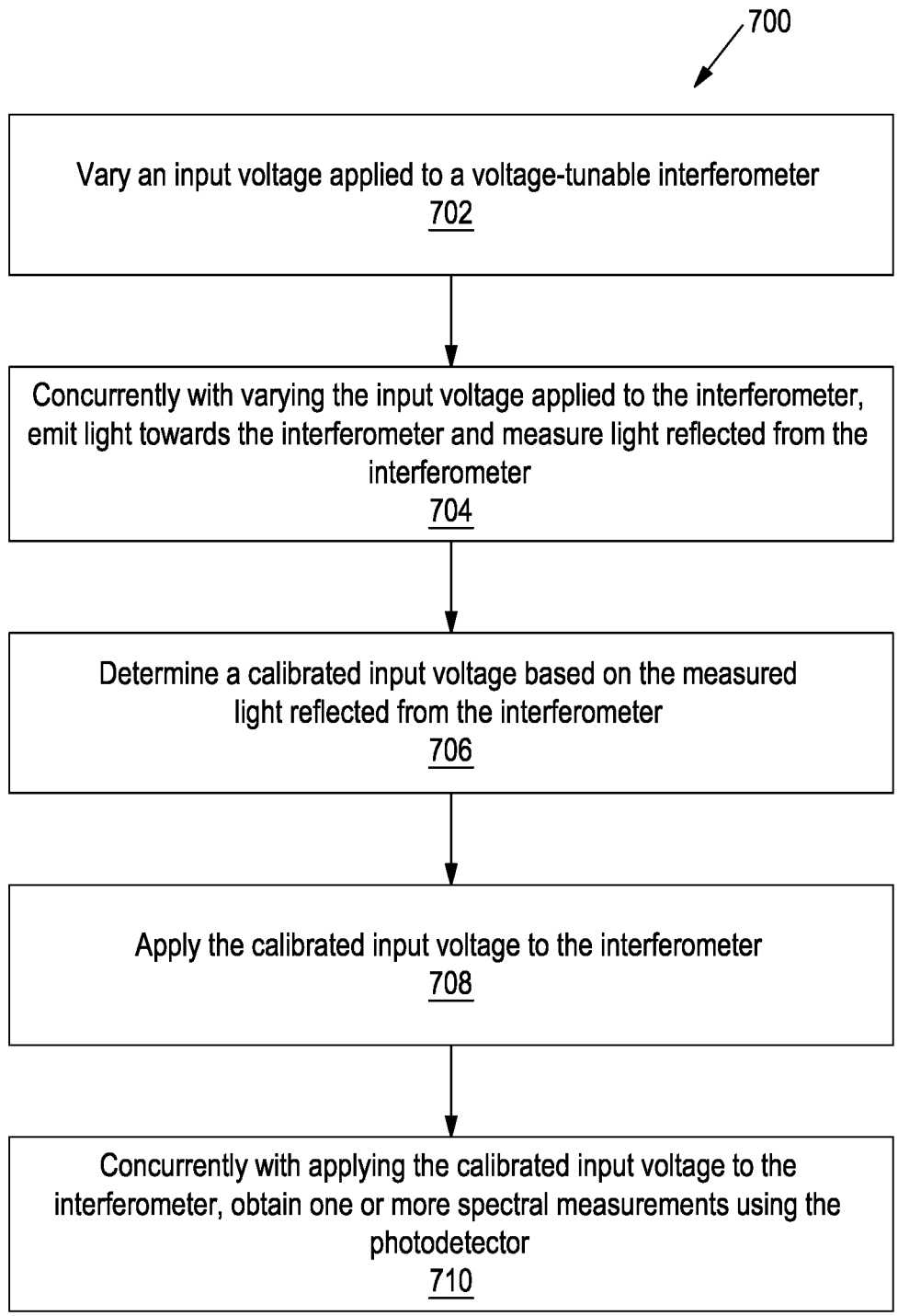
FIG. 7 is a flow chart diagram of an example process for measuring a spectral distribution of light reflected from and/or transmitted through a sample

An example process 700 for using a spectrometer system is shown in FIG. 7. The process 700 can be performed to measure a spectral distribution of light reflected from and/or transmitted through a sample. In some implementations, the process 700 can be performed by one or more of the spectrometer systems and/or sensor modules shown in FIGS. 1, 3, 5, and 6.

In the process 700, an input voltage applied to a voltage-tunable interferometer is varied (step 702). As an example, as shown in FIG. 1, a voltage source 106 can apply an input voltage to an interferometer 104 based on instructions from an electronic control device 110, and vary that input voltage over a period of time.

Concurrently with varying the input voltage applied to the interferometer, light is emitted towards the interferometer, and light reflected from the interferometer is measured (step 704). As an example, as shown in FIGS. 3 and 5, an internal light source 308 can emit light towards the interferometer 104. In some implementations, light can be emitted by a plurality of light emitting elements in a sequence. In some implementations, light can be emitted by a plurality of light emitting elements concurrently. As an example, as shown in FIG. 6, light can be emitted by two internal light sources 600a and 600b, either in a sequence or concurrently.

A calibrated input voltage is determined based on the measured light reflected from the interferometer (step 706). In some implementations, the calibrated input voltage can be determined by determining a value of the input voltage corresponding to a minimum intensity of the measured light reflected from the interferometer. Further, the determination can be made that the value of the input voltage corresponding to the minimum intensity of the measured light reflected from the interferometer is the calibrated input voltage. Example techniques for determining a calibrated input voltage are described, for instance, with respect to FIGS. 4A-4C.

The calibrated input voltage is applied to the interferometer (step 708). As an example, as shown in FIG. 1, a voltage source 106 can apply a calibrated input voltage to an interferometer 104 based on instructions from an electronic control device 110 (e.g., based on the calibration techniques described herein).

Concurrently with applying the calibrated input voltage to the interferometer, one or more spectral measurements are obtained using the photodetector (step 710). Obtaining the one or more spectral measurements can include emitting sample light towards a subject, and measuring sample light reflected from the subject. In some implementations, the originally emitted light can be within a first range of wavelengths, and the sample light can be within a second range of wavelengths. The first range of wavelengths can be different from the second range of wavelengths. In some implementations, the first range of wavelengths can be narrower than the second range of wavelengths.

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the spectrometer system 100 and/or sensor modules 150, 500, or 600 (e.g., the electronic control device 110) can be implemented using digital electronic circuitry, or in computer software, firmware, or hardware, or in combinations of one or more of them. In another example, the process shown in FIG. 7 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

A computer system may include a single computing device, or multiple computers that operate in proximity or generally remote from each other and typically interact through a communication network Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 8:
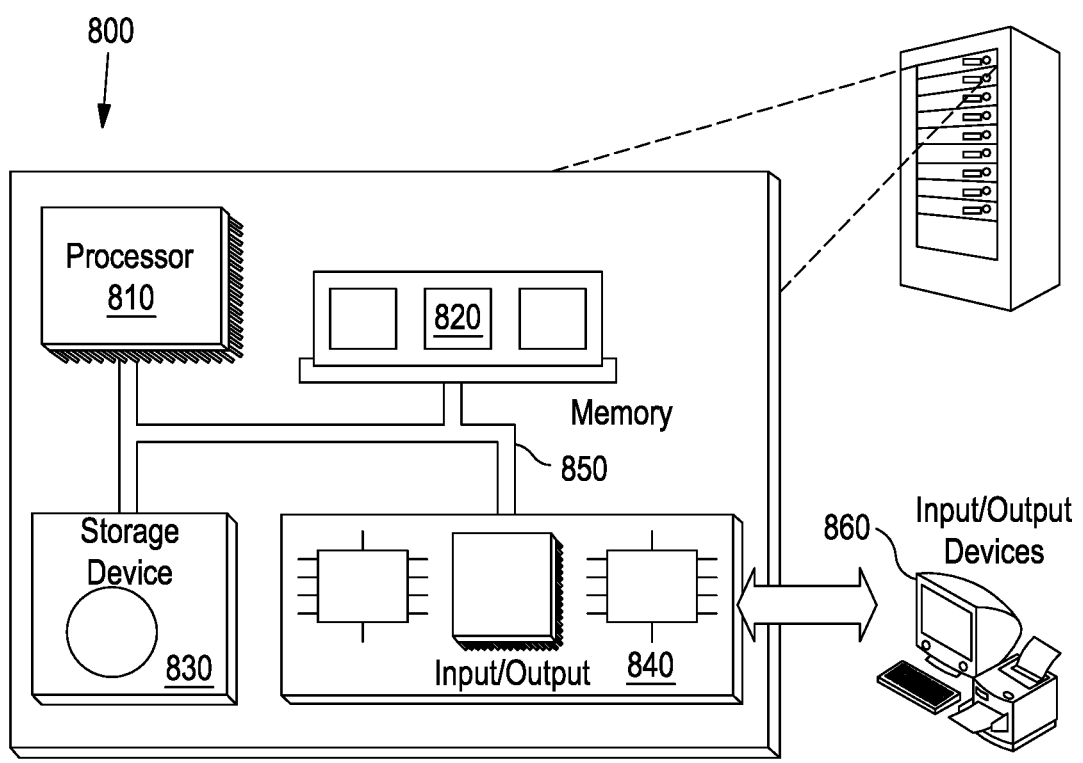
FIG. 8 is a schematic diagram of an example computer system.

FIG. 8 shows an example computer system 800 that includes a processor 810, a memory 820, a storage device 830 and an input/output device 840. Each of the components 810, 820, 830 and 840 can be interconnected, for example, by a system bus 850. In some implementations, the computer system 800 can be used to control the operation of a spectrometer. For example, the electronic control device 110 shown in FIG. 1 can include a computer system 800 to control the operation of one or more components of a spectrometer and/or process measurement data. The processor 810 is capable of processing instructions for execution within the system 800. In some implementations, the processor 810 is a single-threaded processor, a multi-threaded processor, or another type of processor. The processor 810 is capable of processing instructions stored in the memory 820 or on the storage device 830. The memory 820 and the storage device 830 can store information within the system 800.

The input/output device 840 provides input/output operations for the system 800. In some implementations, the input/output device 840 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 860. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, various modifications may be made without departing from the scope of the disclosure. Accordingly, other embodiments are within the scope of the claims.

What is claimed, is:

1. A system comprising:
   a housing defining a cavity and an aperture;
   a photodetector disposed within the cavity;
   a voltage-tunable interferometer disposed within the cavity between the aperture and the photodetector;
   a first light source disposed within the cavity; and
   an electronic control device operable to:
      vary an input voltage applied to the interferometer,
      concurrently with varying the input voltage applied to the interferometer, cause the first light source to emit light towards the interferometer, and measure light reflected from the interferometer using the photodetector,
      determine, based on light reflected from the interferometer and measured by the photodetector, a calibrated input voltage,
      apply the calibrated input voltage to the interferometer, and
      concurrently with applying the calibrated input voltage to the interferometer, obtain one or more spectral measurements using the photodetector.

2. The system of claim 1, wherein the electronic control device is operable to determine the calibrated input voltage by determining a value of the input voltage corresponding to a minimum intensity of the measured light reflected from the interferometer.

3. The system of claim 2, wherein the electronic control device is operable to determine the calibrated input voltage by determining that the value of the input voltage corresponding to the minimum intensity of the measured light reflected from the interferometer is the calibrated input voltage.

4. The system of claim 1, wherein the first light source comprises a plurality of light emitting elements.

5. The system of claim 4, wherein the electronic control device is operable to cause the first light source to emit light towards the interferometer by causing the plurality of light emitting elements to emit light in a sequence.

6. The system of claim 4, wherein the electronic control device is operable to cause the first light source to emit light towards the interferometer by causing the plurality of light emitting elements to emit light concurrently.

7. The system of claim 1, wherein the first light source comprises one or more vertical-cavity surface-emitting laser (VCSEL) emitters.

8. The system of claim 1, wherein the interferometer comprises a Fabry-Perot interferometer (FPI).

9. The system of claim 1, further comprising a second light source disposed outside of the cavity, and
   wherein the electronic control device is operable to obtain the one or more spectral measurements by:
      causing the second light source to emit sample light towards a subject, and
      measuring, using the photodetector, sample light reflected from the subject.

10. The system of claim 9, wherein the first light source is operable to emit light within a first range of wavelengths, wherein the second light source is operable to emit light within a second range of wavelengths, and wherein the first range of wavelengths is different from the second range of wavelengths.

11. The system of claim 10, wherein the first range of wavelengths is narrower than the second range of wavelengths.

12. The system of claim 1, further comprising a host device, and
   wherein the housing, the photodetector, the interferometer, the light source, and the electronic control device are disposed, at least in part, in the host device.

13. The system of claim 12, wherein the host device is at least one of a smart phone or a wearable device.

14. A method comprising:
   varying an input voltage applied to a voltage-tunable interferometer disposed within a cavity;
   concurrently with varying the input voltage applied to the interferometer:
      emitting light, from a light source within the cavity, towards the interferometer, and
      measuring light reflected from the interferometer using a photodetector disposed within the cavity;
   determining, based on the measured light reflected from the interferometer, a calibrated input voltage;
   applying the calibrated input voltage to the interferometer; and
   concurrently with applying the calibrated input voltage to the interferometer, obtaining one or more spectral measurements using the photodetector.

15. The method of claim 14, wherein determining the calibrated input voltage comprises:

determining a value of the input voltage corresponding to a minimum intensity of the measured light reflected from the interferometer.

16. The method of claim 15, wherein determining the calibrated input voltage comprises:
    determining that the value of the input voltage corresponding to the minimum intensity of the measured light reflected from the interferometer is the calibrated input voltage.

17. The method of claim 14, wherein emitting light towards the interferometer comprises emitting light by a plurality of light emitting elements in a sequence.

18. The method of claim 14, wherein emitting light towards the interferometer comprises emitting light by a plurality of light emitting elements concurrently.

19. The method of claim 14, wherein obtaining the one or more spectral measurements comprises:
    emitting sample light towards a subject, and
    measuring sample light reflected from the subject.

20. The method of claim 19 wherein the light is within a first range of wavelengths, wherein the sample light is within a second range of wavelengths, and wherein the first range of wavelengths is different from the second range of wavelengths and optionally the first range of wavelengths is narrower than the second range of wavelengths.

* * * * *